United States Patent
Lemiläinen et al.

(10) Patent No.: US 7,313,381 B1
(45) Date of Patent: Dec. 25, 2007

(54) SIM BASED AUTHENTICATION AS PAYMENT METHOD IN PUBLIC ISP ACCESS NETWORKS

(75) Inventors: Jussi Lemiläinen, Tampere (FI); Jan-Erik Ekberg, Helsinki (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/303,424

(22) Filed: May 3, 1999

(51) Int. Cl.
*H04B 11/00* (2006.01)

(52) U.S. Cl. ............... 455/405; 455/406; 455/407; 455/408; 455/409; 705/1; 705/63; 705/64; 705/79; 380/30

(58) Field of Classification Search .......... 705/79, 705/64, 14, 74, 44; 380/23, 25, 49, 30, 24; 370/60, 236; 713/150, 236; 455/405–409
See application file for complete search history.

(56) References Cited

U.S. PATENT DOCUMENTS

| | | | | |
|---|---|---|---|---|
| 4,616,359 A | * | 10/1986 | Fontenot ............... | 370/60 |
| 5,345,506 A | * | 9/1994 | Tsubakiyama et al. ...... | 380/23 |
| 5,577,100 A | * | 11/1996 | McGregor et al. ......... | 455/406 |
| 5,659,541 A | * | 8/1997 | Chan ..................... | 370/236 |
| 5,675,628 A | * | 10/1997 | Hokkanen ............... | 455/433 |
| 5,724,424 A | * | 3/1998 | Gifford ................ | 380/24 |
| 5,729,537 A | * | 3/1998 | Billstrom .............. | 370/329 |
| 5,737,414 A | * | 4/1998 | Walker et al. .......... | 705/40 |
| 5,881,234 A | | 3/1999 | Schwob | |
| 5,930,777 A | * | 7/1999 | Barber ................. | 705/40 |
| 5,961,593 A | * | 10/1999 | Gabber et al. .......... | 709/219 |
| 5,991,407 A | * | 11/1999 | Murto .................. | 380/23 |
| 6,036,090 A | * | 3/2000 | Rahman et al. .......... | 235/380 |
| 6,047,179 A | * | 4/2000 | Kirby .................. | 455/432.2 |
| 6,167,513 A | * | 12/2000 | Inoue et al. ........... | 713/150 |
| 6,173,407 B1 | * | 1/2001 | Yoon et al. ............ | 713/201 |
| 6,278,705 B1 | * | 8/2001 | Chau et al. ............ | 370/352 |
| 6,349,288 B1 | * | 2/2002 | Barber ................. | 705/26 |
| 6,577,643 B1 | * | 6/2003 | Rai et al. ............. | 370/466 |
| 6,625,438 B2 | * | 9/2003 | Hanson ................. | 455/405 |

FOREIGN PATENT DOCUMENTS

| | | |
|---|---|---|
| WO | WO 98/32301 | 7/1998 |
| WO | WO 98/47270 | 10/1998 |
| WO | WO 99/00958 | 1/1999 |
| WO | WO9949647 A1 * | 9/1999 |

* cited by examiner

*Primary Examiner*—Kambiz Abdi
(74) *Attorney, Agent, or Firm*—Foley and Lardner LLP

(57) ABSTRACT

The invention is a method and system for obtaining connection to a packet data network (14). The invention includes inputting a user request to a first network (10) which requests that the user (12) be authorized for connection to the packet data network through a second network; transmitting from the first network to the second network the user request and an authorization of payment to the second network by the first network for the user's use of the packet data network; transmitting from the second network to the first network authentication information granting the user authentication through the second network to the packet data network; and transmitting the authentication information from the first network to the user which informs the user that authentication to obtain connection to the packet data network has been granted.

35 Claims, 2 Drawing Sheets

SIM BASED AUTHENTICATION AS PAYMENT METHOD IN PUBLIC ISP ACCESS NETWORKS

BACKGROUND OF THE INVENTION

1. Field of the Invention

The present invention relates to a method and system for charging a user (client) for obtaining access to a packet data network.

2. Description of the Prior Art

A user (person, PC and communications device, such as a telephone) typically obtains access to a packet data network, such as an IP network (internet), by connectivity provided by a corporate access network or a public internet service provider (ISP). The connectivity provided by the corporate access network or the ISP provides the user with a whole host of services which are billed to the user's account or to the company's account. These services are the same services the user wishes to access during roaming. In certain circumstances, when the user roams, such as when a roaming agreement exists between the user's home network and a wireless network to which the user roams, through which connectivity is made to a packet data network, all charges are handled automatically by the roaming agreement between the respective networks. As a result, billing consequent from the user's connectivity to the packet data network through the second network is handled seamlessly through the billing arrangement which the user has with the first network.

However, in some situations which are especially prevalent with wireless networks which provide users access to packet data networks, the typical user may wish to remain anonymous with respect to the second network which provides connectivity to the packet data network or when there is no roaming agreement in existence to bill the user between the user's home network and the network to which the user roams and through which the user is connected to the packet data network. In these circumstances, alternative billing arrangements must be made.

The GSM (Global System for Mobile Communications) telephony system uses algorithms in the mobile user units and in the network servers which control authentication of the user to prevent unauthorized access to the network and to provide encryption of the transmissions between users. The GSM System is described in depth in the publication, "The GSM System for Mobile Communications" by Mouly and Pautet, Copyright 1992, which publication is incorporated herein by reference in its entirety. Authentication in a GSM network is performed by the generation of a signed response SRES by both the user mobile and the network which is a function of a unique secret identifier Ki of the user mobile and a random number RAND. The signed response SRES is calculated in a subscriber identification module (SIM) based on Ki inside SIM and RAND obtained from the network authentication center (AUC). Additionally, the user mobile and the network each perform encryption by generating a ciphering key Kc, which is a function of the same random number RAND and the secret identifier Ki of the user mobile. The first authentication algorithm which calculates SRES is known as the A3 algorithm and the second algorithm which computes Kc, which is computed each time a mobile station is authenticated, is known as the A8 algorithm. However, each of the operations of authentication and computing of the ciphering key Kc requires the user mobile to be programmed to perform the aforementioned computations.

SUMMARY OF THE INVENTION

The present invention provides a method and system for payment by a first network on behalf of a user to a second network for connectivity of the user through the second network to a packet data network such as an IP network. The invention utilizes a series of communications between the user, a security server of the network which provides billing for communications by the user through the first network, a public security server and an access server of a second network through which connectivity between the user and the packet data network is provided. The first series of communications are characterized as purchase communications in which the user inputs a user request to the first network which requests that the user be authorized for connection to the packet data network through a second network for a specified quantity of communications, which are referred hereinafter as "service units". Service units without limitation may be in terms of a specified time of connection of the user through the second network to the packet data network or, alternatively, for a fixed monetary value which provides a variable quantity of connection time to the packet data network depending upon a rate structure which varies depending upon the time of connection or other factors. The user's home security server transmits to the public security server of the second network the user request and an authorization of payment by the first network to the second network for the user's use of the packet data network through the second network. Thereafter, the second network transmits to the first network authentication information granting user authentication to obtain connection through the second network to the packet data network. Calculation of the authentication information by the second network is performed by a resident SIM which performs a calculation analogous to the SIM in the GSM system. The authentication information is transmitted from the first network to the user which informs the user that authentication to obtain connection to the packetized data network has been obtained. The user request includes a quantification of connectivity of the user to the packet data network with the quantification comprising at least one service unit with each service unit being encoded with a random number. Preferably each service unit is encoded with a different random number. The authentication information further comprises a shared key which may be used to create secure communications between the user and the packet data network. The authentication information is calculated by a subscriber identification module SIM and includes a number n of service units with each service unit comprising a different random access number uniquely identifying each service unit, a signed response, and the shared key.

Preferably, the inputting of the user request to the first network, the transmitting of the user request and authorization of payment to the second network and the transmitting of the authentication information from the second network to the first network and to the user are by secured communications. Therefore, the transmitting of the shared secret key Kc is not open to the public and furthermore, it is not necessary, as with GSM communications, for the user's mobile to contain the algorithms to compute the shared secret key Kc in order for during subsequent communications between the user and the packet data network for secured communications to be established between a user and the packet data network.

The consumption of the authorized service units occurs after the user has been informed that access to the packet data network has been granted and is initiated by the user transmitting to the second network, such as, but not limited to, during roaming, at least one request for consumption of at least one service unit comprising a random number and a signed response. The second network compares the random number and the signed response of each request for consumption of at least one service unit received from the user with stored random numbers and signed responses to determine if a match exists. If a match exists, the second network permits data packets to pass through the second network between the user and the packet data network. The second network debits from a stored value of n service units which have been granted to a user a number of consumed service units which are identified in each request for consumption of at least one service unit until the number of consumed service units equals the number of n granted service units. In a preferred application, each unused service unit is stored in the second network in a first list and each used service unit is stored in the second network in a second list. Preferably, the first and second lists are hash tables which avoid potential collisions of service units.

A system in accordance with the invention includes a user; a first network which is connectable to the user; a second network which is connectable to the first network and to the user; and a packet data network which is connectable to the second network; and wherein the first network, in response to a user request to the first network that the user be authorized for connection to the packet data network through the second network, transmits to the second network the user request and an authorization of payment by the first network for the use by the user of the packet data network, the second network transmits to the first network authentication information granting the user authentication to obtain connection through the second network to the packet data network, and the first network transmits to the user authentication information which informs the user that authentication to obtain connection to the packet data network has been obtained.

BRIEF DESCRIPTION OF THE DRAWINGS

Like reference numerals and terminology identify like parts throughout the drawings.

DESCRIPTION OF THE PREFERRED EMBODIMENTS

Figure 1:
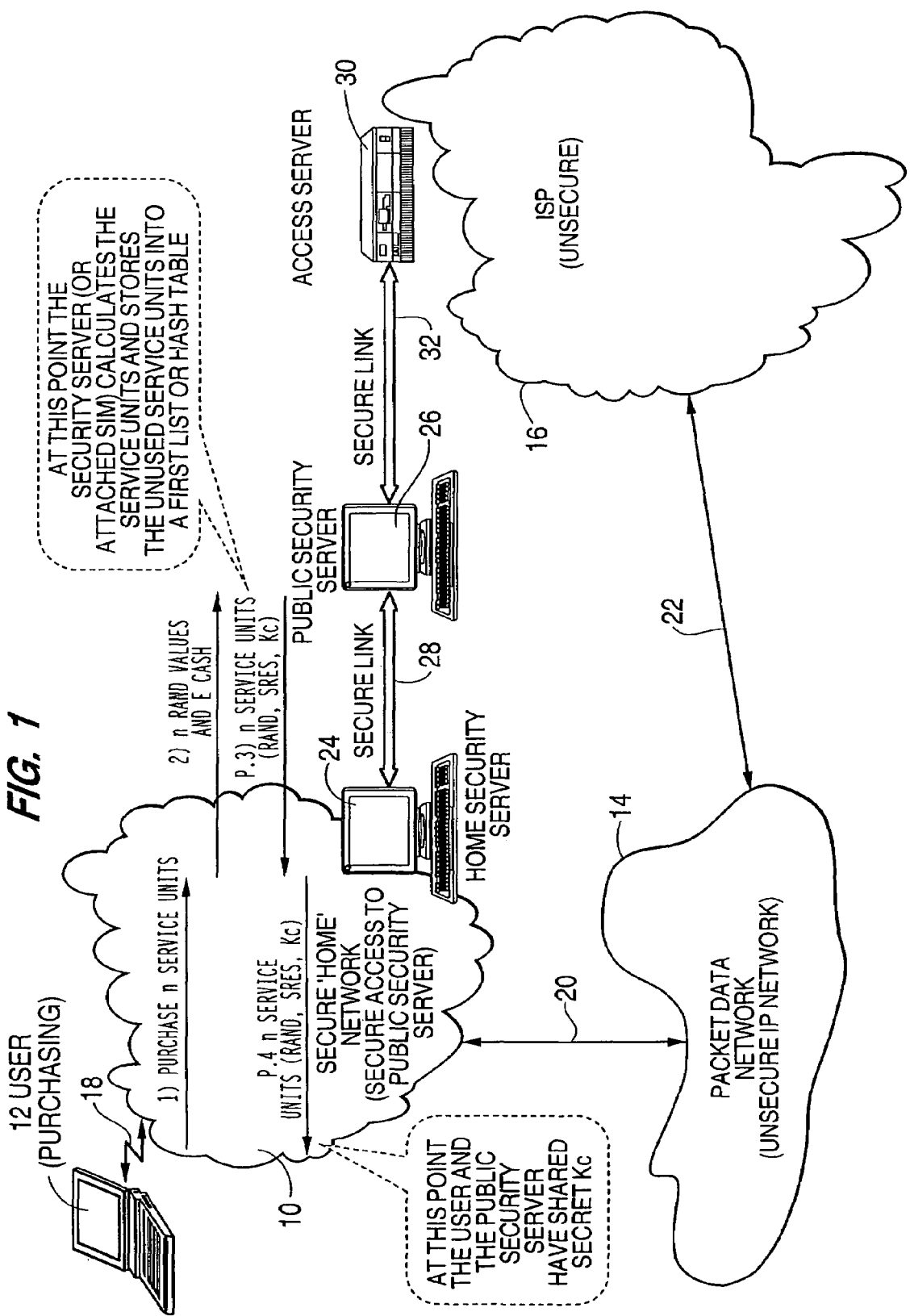
FIG. 1 illustrates the method of purchasing service units in accordance with the present invention by a user with a first network to provide connection to a packet data network through a second network.
Figure 2:
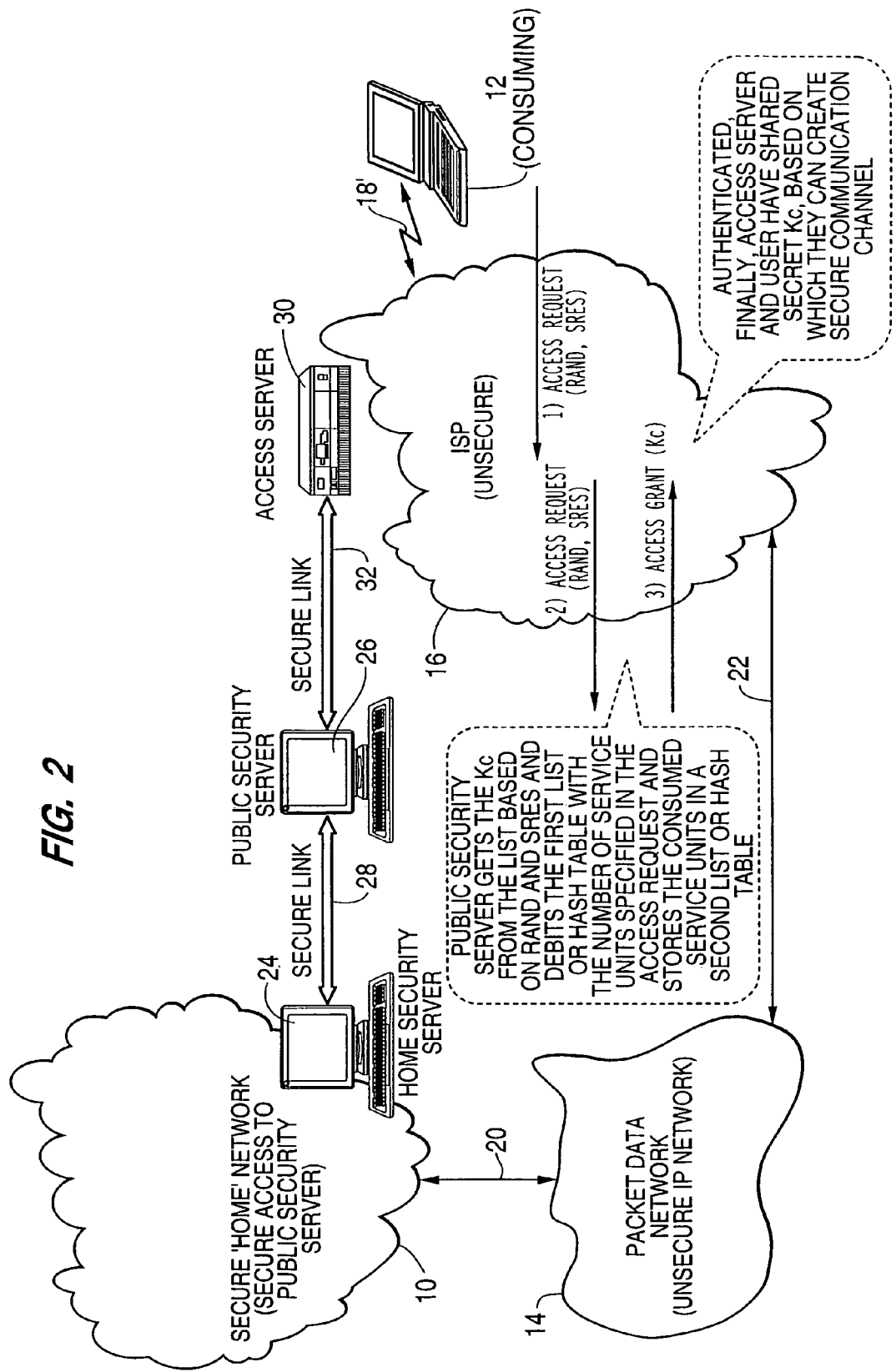
FIG. 2 illustrates the consumption of purchased service units obtained by the method illustrated in FIG. 1 by a user during connection to a packet data network through the second network.

FIG. 1 illustrates a diagram of the purchase of service units billed by a first network 10 to a user 12 to provide connection of the user (e.g. computer and modem) to a packet data network 14 through a second network 16. The billing of the purchase is by the first network 10 to the user 12. The purchase is n service units of connectivity by the user through the second network 16 to the packet data network 14 which are consumed by connection of the user through the second network 16 to the packet data network. It should be understood that the second network 16 is not limited to a single entity and may be comprised of a plurality of geographically separated access networks which may be implemented with different technologies. The second network may be any type of access network through which the user 12 obtains access to the packet data network 14. As illustrated, the connectivity of the user 12 to the first network 10 is via a wireless link 18 which may be provided by any type of wireless service, such as, but not limited to cellular, PCS, 802.11, wireless LAN, etc., but it should be understood that any type of connectivity to the first network 10 is within the scope of the invention, including wireline. The illustrated connectivity of the user 12 to the packet data network 14 via communication line 20 is conventional and is not part of the present invention. The purchase of the n service units, wherein n is any integer, is later used for authentication and billing the user 12 when the user accesses the packet data network 14 through the second network 16 as illustrated in FIG. 2 as explained below.

The initial purchase sequence involves four steps for purchasing the n service units as illustrated in FIG. 1. The first step "1" involves the inputting by the user 12 from the user's processor a user request requesting purchase of the n service units which is transmitted to the home security server 24 of the first network 10. The purchase of n service units provides access and specifies a quantity or value of communications to the packet data network 14 through the second network 16. The purchase of n service units is transmitted to a home security server 24 in the first network 10 to provide the user with authority for connection to the packet data network 14 through the second network 16 which, in a preferred application, provides connectivity to the packet data network when the user 12 is roaming.

The second step is a transmission "2", between the home security server 24 and the public security server 26 of the second network 16 which quantifies the n service units by assigning a unique identifying random number RAND to each service unit. Alternatively, each unique RAND could be generated by the user 12 and forwarded to the home security server 24 as part of the n service units.

The communications between the home security server 24 and the public security server 26 are via a secure link 28. The access server 30 of the second network 16 is connected to the public security server 26 by secure communication link 32. The access server 30 in combination with the public security server 26 controls passage of packets between the second network 16 and the packet data network 14 over the unsecured communication link 22 as described below in conjunction with FIG. 2. Preferably, the user request over link 18 to the home security server 24 and the transmission on n random numbers identifying the n service units to be purchased from the second network 16 between the home security server and the public security server 26 are via a secure link. The second transmission "2" between the home security server 24 and the public security server 26 in addition to the quantification of n service units, which are each preferably individually encoded as a unique random number RAND, includes an authorization of payment, preferably in terms of electronic payment (E cash). However, the payment may be any mechanism for clearing payment from the first network 10 to the second network 16 to secure the user's connectivity to the packet data network 14.

The public security server 26 calculates the n service units and stores them in a first list which may be preferably a hash table storing the number of unused service units. Furthermore a second list, which may preferably be a hash table, accounts for consumed service units from the n authorized service units. Alternatively, the second list may be eliminated by deleting the consumed service units from the first list as they are consumed. The hash tables, which rely upon well-known hashing functions which are well known and are not described in detail in view of their known status, provide a unique address for locating all of the n authorized service units during their history from authorization to consumption. During the consumption phase, as described below in FIG. 2, the unused and used service units are accounted for in order to insure that only the purchased amount of connectivity (time or monetary value) of the user 12 to the packet data network 14 occurs.

The third step in the purchase phase is a transmission "3" from the public security server 26 of the second network 16 to the first network of authentication information in the form of n information triplets each corresponding to information necessary to encode an individual service unit. The authentication information preferably includes for each service unit the individual random numbers RAND, a signed response RES, which is calculated in a manner identical to the signed response calculated by GSM authentication using the prior art A3 algorithm, and the cipher key Kc which may be used to provide secure communications between the user 12 and the packet data network 14 through the second network 16. The cipher key Kc is also a shared key between the access server 30 and the user 12 in the consuming phase of FIG. 2.

The fourth step in the purchase phase is a transmission "4" during which the home security server 24 receives the authentication information comprising the n triplets of RAND, SRES, Kc and forwards the n triplets to the user 12 which informs the user that the purchase of service units for consumption in the data network 14 has been completed. The fourth step completes the purchase sequence which enables the user 12 to secure either fixed time units of connectivity to the packet data network 14 through the second network 16 or a variable number of service units representing connectivity which is variable as a function of time (prime time and off time) or other criteria.

It is important to note that upon receipt of the authentication information by the user 12, the user and the public security server 26 have in storage the shared secret cipher key Kc necessary for establishing secured transmissions between the user and the packet data network 14 through the second network 16 during the consumption of the n service units. The generation of the signed response SRES and the shared secret cipher key Kc by the public security server 26 and transmitting the same back to the home security server 24 via secure communication link 28 and from the home security server to the user 12 eliminates the requirement that the purchase of service units requires the user's processor to have the A3 and A8 algorithms present (which are utilized in GSM authentication) to purchase and consume service units in view of the public security server 26 being the source of the initial calculation of the shared secret cipher key Kc necessary for producing the secured communications or/and the user authentication.

The second consumption phase of the method of the present invention involves three steps which are illustrated in FIG. 2. As illustrated, the user 12 has roamed (moved from connection to the first network 10) and accesses the second network 16 via link 18' which preferably is a wireless link but it should be understood that the invention is not limited thereto. The access server 30 controls the access of the users to the second network 16 and optionally the traffic of data packets between the user 12 and the packet data network 14 during the consumption of the n service units. However, the access server may only perform authentication when the user 12 is newly connected to the second network 16 and thereafter, the access server may not be involved at all with the data exchange between the user and the packet data network 14 during the user's connection to the second network.

The first step involves the user 12, after the user has been informed that authorization for connection to the packetized data network 14 has been obtained, transmitting a first communication "1" to the access server 30 of the second network 16 via link 18' containing at least one access request. Each access request contains an individual random access number RAND and a signed response SRES which comprise identification of each service unit.

The second step involves a transmission "2" which is an access request that is relayed from the access server 30 to the public security server 26. The public security server 26 compares each random number RAND and the signed response SRES of each request for consumption of at least one service unit received from the user 12 with the stored random numbers RAND and signed responses SRES stored in the public security server to determine if a match exists. If the public security server 26 detects that a match exists, the access server 30 of the second network 16 permits the data packets of communications between the user 12 and the packet data network 14 to pass through the second network between the user 12 and the packet data network 14.

The public security server 26 of the second network 16 debits from the stored value n of service units in the first list or hash table, which have been granted to the user 12 as a consequence of payment terms being reached between the first network 10 and the second network 16, a number of consumed service units which are identified in each request for consumption of at least one service unit until the number of consumed service units equals the number of n granted service units. The second optional list or hash table stores those service units which have been returned to the public security server 26 and verified as having been consumed. Therefore, a running total is maintained in the public security server 26 at all times of those service units which have been granted, those service units which are consumed and those service units which are not consumed or, alternatively, if the second list is not used, only the first list of unconsumed service units is kept with the consumed service units being deleted therefrom. Upon each service unit being matched by the public security server 26, the cipher key Kc is calculated from the list based on each service unit's random number RAND and the signed response SRES.

The third step is a transmission "3" which is an access grant permitting the user 12 and the packet data network 14 to communicate through the second network 16. The cipher key Kc is used to encrypt the access granted to the user 12 to the packet data network 14 through the unsecured communication path 22 between the second network 16 and the packet data network. If, on the other hand, a match is not obtained between a received service unit at the public security server 26 and the stored service units, then the access server 30 denies connectivity between the user 12 and the packet data network 14 via the unsecured communication path 22.

It should be understood that the present invention is not limited to the network architecture discussed above and may be practiced in diverse network configurations. Furthermore, the design of the networks in which the present invention is practiced is well known and in itself is not part of the present invention. Additionally, the methodology used for encoding of the transmissions between the user 12, the first network 10 and the second network 16 during the purchase and consumption methods of FIGS. 1 and 2 may be accomplished in diverse ways which is not part of the present invention.

While the invention has been described in terms of its preferred embodiments, it should be understood that numerous modifications may be made thereto without departing from the spirit and scope of the invention as defined in the appended claims. It is intended that all such modifications fall within the scope of the appended claims.

The invention claimed is:

1. A method of obtaining connection by a user through a first network and through a second network to a packet data network with the connection being paid for by the first network making payment to the second network comprising:

inputting a user request to the first network which requests that the user be authorized for connection to the packet data network through the second network, wherein the first network receives a quantification of the connectivity the user requests;

transmitting from the first network to the second network the user request and an authorization of payment to the second network by the first network for the use by the user of the packet data network;

transmitting from the second network to the first network authentication information granting the user authentication to obtain connection through the second network to the packet data network; and transmitting the authentication information from the first network to the user which informs the user that authentication to obtain connection to the packet data network has been obtained; and wherein requesting to make the payment for the connection to the packet data network is the result of communications which first originate with the user request to the first network, the user is anonymous and there is no roaming agreement or contract with the packet data network for the user to obtain the connection thereto.

2. A method in accordance with claim 1, wherein:
the user request includes the quantification of connectivity which the user requests to the packet data network.

3. A method in accordance with claim 2 wherein:
the quantification comprises at least one service unit with each service unit being encoded with a random number.

4. A method in accordance with claim 3 wherein:
each service unit is encoded with a different random number.

5. A method in accordance with claim 1 wherein:
the authentication information comprises a shared key which may be used to create secure communications between the user and the packet data network.

6. A method in accordance with claim 5 wherein:
authentication information is a subscriber identification module SIM comprising a number n of service units with each service unit comprising a different random access number uniquely identifying each service unit, a signed response SRES and the shared key Kc.

7. A method in accordance with claim 2 wherein:
the authentication information comprises a shared key which may be used to create secure communications between the user and the packet data network.

8. A method in accordance with claim 7 wherein:
authentication information is a subscriber identification module SIM comprising a number n of service units with each service unit comprising a different random access number uniquely identifying each service unit, a signed response SIRES and the shared key Kc.

9. A method in accordance with claim 3 wherein:
the authentication information comprises a shared key which may be used to create secure communications between the user and the packet data network.

10. A method in accordance with claim 5 wherein:
the second network computes a subscriber identification module SIM comprising the number of service units with each service unit comprising a different random access number uniquely identifying each service unit, a signed response and the shared key Kc.

11. A method in accordance with claim 4 wherein:
the authentication information comprises a shared key which may be used to create secure communications between the user and the packet data network.

12. A method in accordance with claim 11 wherein:
authentication information is a subscriber identification module SIM comprising the number of service units with each service comprising a different random access number uniquely identify each service unit, a signed response and the shared key.

13. A method in accordance with claim 1 wherein:
the inputting of the user request to the first network, the transmitting of the user request and an authorization of payment to the second network, and the transmitting of the authentication information from the second network to the first network and to the user are by secure communications.

14. A method in accordance with claim 2 wherein:
the inputting of the user request to the first network, the transmitting of the user request and an authorization of payment to the second network, and the transmitting of the authentication information from the second network to the first network and to the user are by secure communications.

15. A method in accordance with claim 3 wherein:
the inputting of the user request to the first network, the transmitting of the user request and an authorization of payment to the second network, and the transmitting of the authentication information from the second network to the first network and to the user are by secure communications.

16. A method in accordance with claim 4 wherein:
the inputting of the user request to the first network, the transmitting of the user request and an authorization of payment to the second network, and the transmitting of the authentication information from the second network to the first network and to the user are by secure communications.

17. A method in accordance with claim 5 wherein:
the inputting of the user request to the first network, the transmitting of the user request and an authorization of payment to the second network, and the transmitting of the authentication information from the second network to the first network and to the user are by secure communications.

18. A method in accordance with claim 3 wherein:
after the user is informed that authentication to obtain connection to the packet data network has been obtained, the user transmits to the second network at least one request for consumption of at least one service unit comprising a random number RAND and a signed response SRES;

the second network compares the random number RAND and signed response SIRES of each request for consumption of at least one service unit received from the user with stored random numbers RAND and signed responses SIRES to determine if a match exists; and if a match exists, the second network permits data packets to pass through the second network between the user and the packet network.

19. A method in accordance with claim 18 wherein:
the second network debits from a stored value of service units which have been granted to the user a number of consumed service units which are identified in each request for consumption of at least one service unit until the number of consumed service units equals the number of granted service units.

20. A method in accordance with claim 19 wherein:
each unused service unit is stored in the second network in a hash table and each used service unit is stored in the second network in a hash table.

21. A system comprising:
a user;
a first network connected to the user;
a second network connected to the first network and to the user; and
a packet data network connected to the second network; and wherein
the first network, in response to a user request to the first network that the user be authorized for connection to the packet data network through the second network wherein the connection is paid for by the first network making payment to the second network and wherein the first network receives a quantification of the connectivity the user requests, transmits to the second network the user request and an authorization of payment by the first network for the use by the user of the packet data network, the second network transmits to the first network authentication information granting the user authentication to obtain connection through the second network to the packet data network, and the first network transmits to the user authentication information which informs the user that authentication to obtain connection to the packet data network has been obtained; and wherein
requesting to make the payment is the result of communications which first originate with the user request to the first network, the user is anonymous and there is no roaming agreement or contract with the packet data network for the user to obtain the connection thereto.

22. A method of obtaining connection by a user through a first network and through a second network to a packet data network with the connection being paid for by the first network making payment to the second network comprising:
inputting a user request to the first network which requests that the user be authorized for connection to the packet data network through the second network, wherein the first network receives a quantification of the connectivity the user requests;
transmitting from the first network to the second network the user request and an authorization of the payment to the second network by the first network for the use by the user of the packet data network;
transmitting from the second network to the first network authentication information granting the user authentication to obtain connection through the second network to the packet data network;
transmitting the authentication information from the first network to the user which informs the user that authentication to obtain connection to the packet data network has been obtained; and
after the user is informed that authentication to obtain connection to the packet data network has been obtained, the user transmits to the second network at least one request for consumption of at least one service unit and the second network debits from a stored value of service units which are granted to the user a consumed number of service units; and wherein
requesting to make the payment for the connection to the packet data network is the result of communications which first originate with the user request to the first network, the user is anonymous and there is no roaming agreement or contract with the packet data network for the user to obtain the connection thereto.

23. A method in accordance with claim 22 wherein:
the number of consumed service units are identified in each request for consumption of at least one service unit until the number of consumed service units equals a number of granted units.

24. A system comprising:
a user;
a first network connected to the user;
a second network connected to the first network and to the user; and
a packet data network connected to the second network; and wherein
the first network, in response to a user request to the first network that the user be authorized for connection to the packet data network through the second network wherein the connection is paid for by the first network making payment to the second network and wherein the first network receives a quantification of the connectivity the user requests, transmits to the second network the user request and an authorization of the payment by the first network for the use by the user of the packet data network, the second network transmits to the first network authentication information granting the user authentication to obtain connection through the second network to the packet data network, and the first network transmits to the user authentication information which informs the user that authentication to obtain connection to the packet data network has been obtained; and
after the user is informed that authentication to obtain connection to the packet data network has been obtained, the user transmits to the second network at least one request for consumption of at least one service unit and the second network debits from a stored value of service units which are granted to the user a consumed number of service units; and wherein requesting to make the payment for the connection to the packet data network is the result of communications which first originate with the user request to the first network, the user is anonymous and there is no roaming agreement or contract with the packet data network for the user to obtain the connection thereto.

25. A system in accordance with claim 24 wherein:
the number of consumed service units are identified in each request for consumption of at least one service unit until the number of consumed service units equals a number of granted units.

26. A method of obtaining connection by a user through a first network and through a second network to a packet data network with the connection being paid for by the first network making payment to the second network comprising:
connection to the packet data network through the second network;
transmitting from the first network to the second network the user request and an authorization of the payment to the second network by the first network for the use by the user of the packet data network, wherein the first network receives a quantification of the connectivity the user requests;

transmitting from the second network to the first network authentication information granting the user authentication to obtain connection through the second network to the packet data network;

transmitting the authentication information from the first network to the user which informs the user that authentication to obtain connection to the packet data network has been obtained;

the user roams to the second network; the user requests connection to the packet data network while roaming in the second network; and the second network grants connection to the packet data network while roaming in the second network based upon the authorization of payment received by the second network; and wherein requesting to make the payment for the connection to the packet data network is the result of communications which first originate with the user request to the first network, the user is anonymous and there is no roaming agreement or contract with the packet data network for the user to obtain the connection thereto.

27. A method in accordance with claim 26, wherein:

the authorization of payment quantifies an amount of payment that the first network will pay to the second network for connection of the user to the packet data network when the user roams in the second network; and payment for the connection of the user while roaming in the second network for connection to the packet data network is charged against the authorization.

28. A method in accordance with claim 26 wherein:

the authentication information comprises a shared key which may be used to create secure communications between the user and the packet data network.

29. A method in accordance with claim 28 wherein:

the authentication information is a subscriber identification module SIM comprising a number n of service units with each service unit comprising a different random access number uniquely identifying each service unit, a signed response SIRES and the shared key Kc.

30. A method in accordance with claim 26 wherein:

the user request includes a quantification of connectivity which the user requests to the packet data network; and the quantification comprises at least one service unit with each service unit being encoded with a random number.

31. A method in accordance with claim 30 wherein:

each service unit is encoded with a different random number.

32. A method in accordance with claim 27 wherein: the user request includes a quantification of connectivity which the user requests to the packet data network; and the quantification comprises at least one service unit with each service unit being encoded with a random number.

33. A method in accordance with claim 32 wherein: each service unit is encoded with a different random number.

34. A method in accordance with claim 26 wherein:

after the user is informed that authentication to obtain connection to the packet data network has been obtained, the user transmits to the second network at least one request for consumption of at least one service unit comprising a random number RAND and a signed response SRES;

the second network compares the random number RAND and signed response SRES of each request for consumption of at least one service unit received from the user with stored random numbers RAND and signed responses SRES to determine if a match exists; and if a match exists, the second network permits data packets to pass through the second network between the user and the packet network.

35. A method in accordance with claim 27 wherein:

after the user is informed that authentication to obtain connection to the packet data network has been obtained, the user transmits to the second network at least one request for consumption of at least one service unit comprising a random number RAND and a signed response SIRES;

the second network compares the random number RAND and signed response SIRES of each request for consumption of at least one service unit received from the user with stored random numbers RAND and signed responses SRES to determine if a match exists; and if a match exists, the second network permits data packets to pass through the second network between the user and the packet network.

* * * * *